(12) United States Patent
Chadha et al.

(10) Patent No.: US 6,906,719 B2
(45) Date of Patent: Jun. 14, 2005

(54) SYSTEM AND METHOD FOR CONTENT-BASED QUERYING USING VIDEO COMPRESSION FORMAT

(75) Inventors: Atul Chadha, San Jose, CA (US); Balakrishna Raghavendra Iyer, San Jose, CA (US); Apostol Ivanov Natsev, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 10/270,791

(22) Filed: Oct. 12, 2002

(65) Prior Publication Data

US 2004/0071368 A1 Apr. 15, 2004

(51) Int. Cl.[7] .................... G06T 15/00; G06K 9/36
(52) U.S. Cl. .............. 345/473; 382/190; 382/232; 382/305
(58) Field of Search ................. 345/473; 382/190, 382/232, 305; 348/220.1; 375/240.16, 240.14

(56) References Cited

U.S. PATENT DOCUMENTS

| | | | |
|---|---|---|---|
| RE33,316 E | 8/1990 | Katsuta et al. ............ 364/521 |
| 5,038,390 A | 8/1991 | Ravi Chandran ............ 382/56 |
| 5,174,641 A | 12/1992 | Lim ............................ 388/141 |
| 5,321,522 A | 6/1994 | Eschbach ................... 358/433 |
| 5,768,437 A | * 6/1998 | Monro et al. ............... 382/249 |
| 5,828,848 A | * 10/1998 | MacCormack et al. ..... 709/247 |
| 5,854,856 A | 12/1998 | Moura et al. ............... 382/232 |
| 5,923,786 A | * 7/1999 | Murayama ................. 382/242 |
| 6,041,147 A | 3/2000 | Mead ......................... 382/305 |
| 6,594,790 B1 | * 7/2003 | Sato et al. .................. 714/746 |
| 6,765,611 B1 | * 7/2004 | Gallagher et al. ....... 348/222.1 |

* cited by examiner

*Primary Examiner*—Phu K. Nguyen
(74) *Attorney, Agent, or Firm*—Samuel A. Kassatly (57) ABSTRACT

A visual query system, and associated method and computer program product enhance and accelerate content-based querying, and present a new image similarity measure using known or available software applications and hardware components of video compression systems. The present system encodes images as consecutive frames in a video sequence and uses the ratio between the file length of the compressed sequence and the original file length as a distance measure. The system considers the compression ratio to be an estimate of the entropy of the combined images, which can be used to estimate the amount of new information introduced from one image to the other.

40 Claims, 6 Drawing Sheets

SYSTEM AND METHOD FOR CONTENT-BASED QUERYING USING VIDEO COMPRESSION FORMAT

FIELD OF THE INVENTION

The present invention relates to a method, system, and computer program product that use available video compression techniques to enable the navigation through a set of similar objects and the identification of objects that meet query criteria. As an example, given a sample digital image, the present invention retrieves visually similar images from a large collection of images stored on local, networked, or web-linked repositories.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

Typically, each search result rendered by the search engine includes a list of individual entries that have been identified by the search engine as satisfying the user's search expression. Each entry or "hit" includes a hyperlink that points to a Uniform Resource Locator (URL) location or web page. In addition to the hyperlink, certain search result pages include a short summary or abstract that describes the content of the web page.

A common technique for accessing textual materials on the Internet is by means of a "keyword" combination, generally with Boolean operators between the words or terms, where the user enters a query comprised of an alphanumeric search expression or keywords. In response to the query, the search engine sifts through available web sites to match the words of the search query to words in a metadata repository, in order to locate the requested information.

This word match based search engine parses the metadata repository to locate a match by comparing the words of the query to indexed words of documents in the repository. If there is a word match between the query and words of one or more documents, the search engine identifies those documents and returns the search results in the form of HTML pages.

Furthermore, not only is the quantity of the WWW material increasing, but the types of digitized material are also increasing. For example, it is possible to store alphanumeric texts, data, audio recordings, pictures, photographs, drawings, images, video and prints as various types of digitized data. However, such large quantities of materials are of little value unless it the desired information is readily queryable, browseable and retrievable in an acceptably short period of time. While certain techniques have been developed for accessing specific types of textual materials, these techniques are at best moderately adequate for accessing graphic, audio or other specialized materials. Consequently, there are large bodies of published materials that still remain inaccessible and thus unusable or significantly underutilized.

As a result, with the proliferation of the Internet, it is becoming increasingly important to enable users to search the World Wide Web (WWW) by content and context, and not be limited to textual searches. More specifically, given a sample object, the problem of finding similar objects from a large collection of objects is called content-based object querying and retrieval. However, similarity among objects is subjective, and in the case of images, visual similarity comprises matching color, shape, and texture features.

Traditional methods for solving the above problem typically transform each image into one or more "signatures" pertaining to the color, shape, and texture of the images. Each image is effectively mapped to some d-dimensional points representing the features of the image and stored into an index for fast search and retrieval. Given a query image, the same transformation is applied to it, extracting its feature vectors, after which the index is queried for all points (i.e., images) that are within a certain distance from the query feature vectors. The distance measure used is typically the Euclidean distance between the points in the d-dimensional space, which is difficult to interpret intuitively, and may not be too meaningful to the user.

Another traditional method uses the Euclidean distance to match regions, and then approximates the total matched area between two images. The final similarity measure for two images is computed as the fraction of matched versus total image area in the two images. The first type of similarity measures (i.e., the Euclidean distance) has no visual meaning and is difficult to interpret for the user. The second approach of using matched area as a similarity measurement is more intuitive but is difficult to compute.

As an illustration, in the context of Internet shopping (or e-commerce) applications, if a user is shopping for a particular item, and the search result provides a list browseable images (or digital pictures), each of these images can be downloaded for example, in 10 seconds. As a result, it could take a shopper about 10 minutes to browse 60 such images. By contrast, when shopping in a retail store, the shopper is capable of visually scanning and comparing 60 substantially similar items in a fraction of the browsing time.

Such a delay in browsing Internet images could undermine the convenience of online shopping, and may lead to lost opportunities. There is therefore a still unsatisfied need for a system, method, and computer program product for improving the conventional design applications of content-based object querying by improving the image similarly search performance of search engines.

SUMMARY OF THE INVENTION

The present invention satisfies this need, and provides a visual query system, and associated method and computer program product (collectively referred to herein as "the present system") that enhance and accelerate content-based querying. To this end, the present invention presents a new image similarity measure using known or available software applications and hardware components of video compression systems.

As an illustration, given two images, the present system encodes them as two consecutive frames in a video sequence and uses the compression ratio of encoding one image given another as a distance measure. The compression ratio is the ratio between the file length of the compressed sequence and the original (uncompressed) file length. The system considers the compression ratio to be an estimate of the entropy of the combined images, which can be used to estimate the amount of new information introduced from one image to the other.

The entropy is a well-known concept in information theory and data compression, and denotes the amount of information for an object (i.e., the number of bits needed to encode it) given a prediction model. In this context, the present system essentially uses one image to predict the other, and measures the difference between the prediction and the actual image. This analysis provides a solid theoretical interpretation of the proposed image similarity measure because the more visually similar two images are, the less information is introduced from one image to the other, and thus the less number of bits will be needed to encode the two images and the greater the compression ratio will be. Similarly, the higher compression ratio is, the better the images can be predicted from each another, and therefore the images are very similar.

The present system offers numerous advantages over existing methods, among which are the following: The similarity measure calculated by the present invention has a strong theoretical backing and interpretation. The present system is easily maintainable, and fully utilizes existing domain-specific knowledge. The present system is readily implementable in existing search systems as a plug in.

The foregoing and other features and advantages are realized by the present system that treats the two images as successive frames in a video sequence and that uses the resulting compression ratio as an estimate of their similarity. The present system employs readily available or known video coding software applications and hardware components, thereby utilizing existing resources and achieving significant technology transfer from the mature field of video coding to the relatively new field of content-based image search and retrieval.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
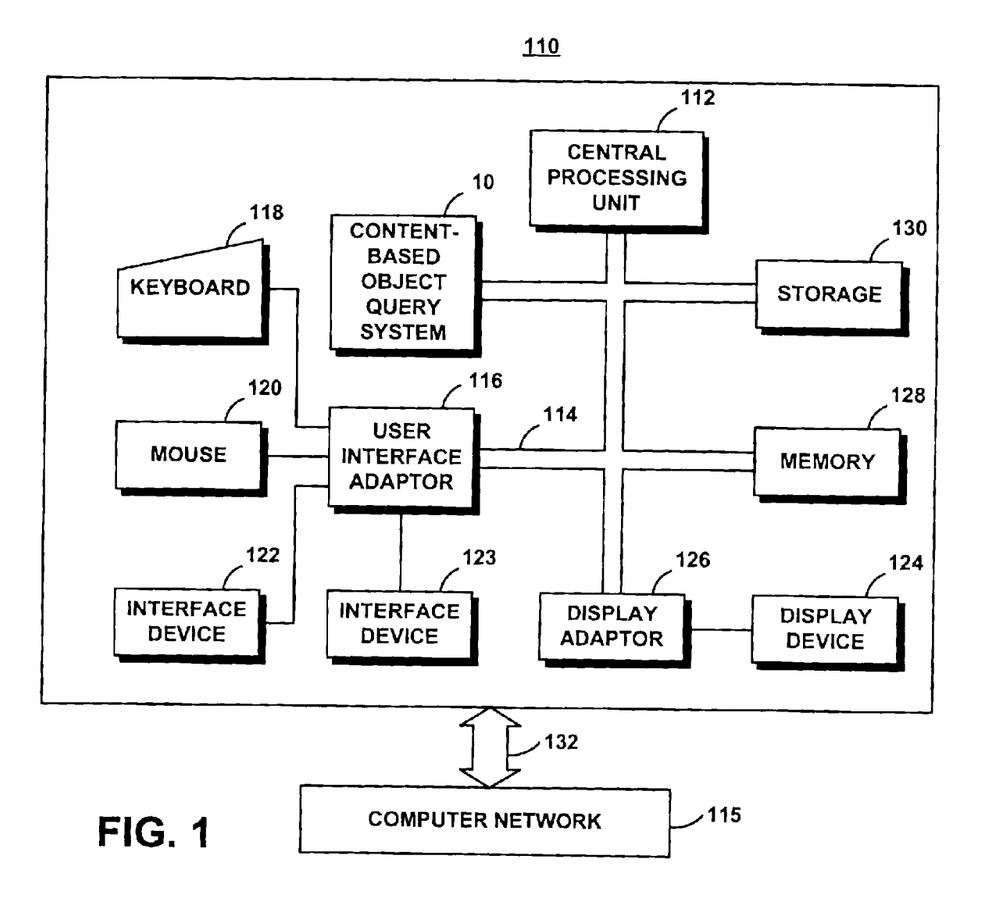
FIG. 1 is a high level block diagram of a computer workstation environment in which a visual query system of the present invention may be implemented.

FIG. 1 illustrates a representative computer workstation 110 in which a visual query system (also referred to as content-based object querying system) 10 of the present invention may be practiced. System 10 includes a software programming code or computer program product that may be embodied on any of a variety of known media for use with a data processing system, such as a diskette, hard drive, or CD-ROM.

The code may be distributed on such media, or may be distributed to users from the memory or storage of one computer system over a network of some type to other computer systems for use by users of such other systems. Alternatively, the programming code may be embodied in a memory, and accessed by a central processing unit. The techniques and methods for embodying software programming code in memory, on physical media, and/or distributing software code via networks are well known and will not be further discussed herein.

Figure 2:
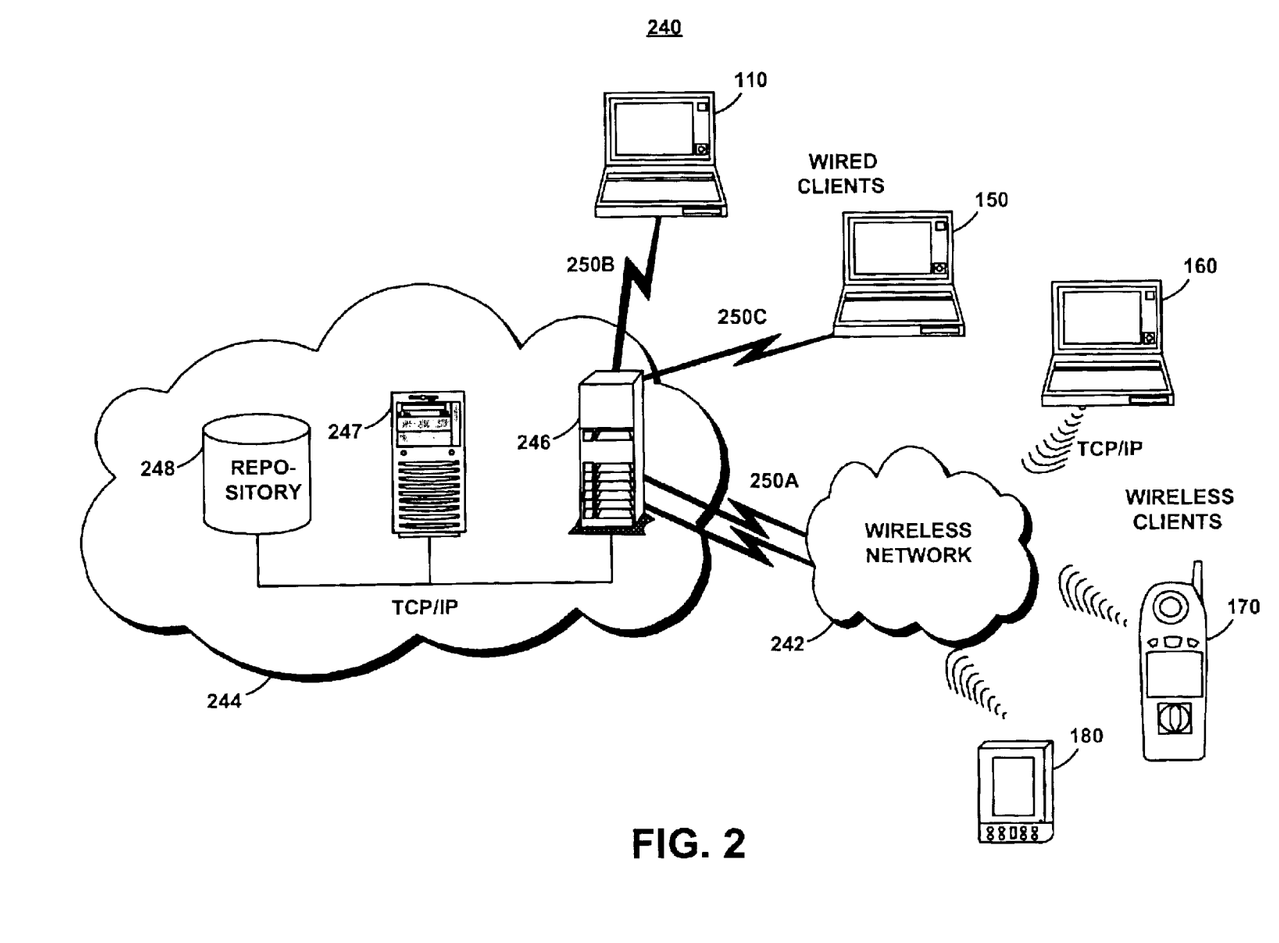
FIG. 2 illustrates an exemplary networked computing environment in which the workstation and the visual query system of FIG. 1 may be used.

In an alternative embodiment, system 10 includes a software or computer program product that is modular and that may be embedded within, or installed on workstation 110 or on a host server 247 (FIG. 2).

The workstation 110 can be, for example, a personal computer (PC) that is connected to a plurality of peripheral devices. Typically, the workstation 110 includes a central processing unit (CPU) 112 and a bus 114 employed to connect and to enable communication between the central processing unit 112 and the other components of the workstation 110.

The workstation 110 further includes a user interface adaptor 116 that connects the central processing unit 112 via the bus 114 to one or more interface devices, such as a keyboard 118, a mouse 120, and/or other interface devices 122, 123, such as a touch screen, a digitized pad, and so forth. The bus 114 also connects a display device 124, such as a monitor or a liquid crystal display (LCD) screen, to the central processing unit 112 via a display adaptor 126. The bus 114 also connects the central processing unit 112 to a memory 128 and a storage device 130 such as a hard drive, diskette drive, tape drive, etc.

The workstation 110 may communicate with other computers or networks of computers 115, for example via a communications channel or modem 132. Alternatively, the workstation 110 may communicate using a wireless interface, such as a cellular digital packet data (CDPD) card. The workstation 110 may be associated with such other computers in a Local Area Network (LAN) or a Wide Area Network (WAN). The workstation 110 can also be a client in a client/server arrangement with another computer.

Referring now to FIG. 2, it illustrates a data processing network 240 in which the present visual query system 10 may be practiced. The network 240 includes, for example, a plurality of networks, such as a wireless network 242 and the Internet 244, each of which may connect a plurality of individual workstations, such as workstations 110, 150, 160, 170, 180. Additionally, one or more Local Area Networks (LANs) may be included, where a Local Area Network may comprise a plurality of intelligent workstations coupled to a host processor.

The networks 242 and 244 may also include mainframe computers or servers, such as a gateway 246 or application server 247 that accesses a data repository 248, using Transmission Control Protocol/Internet Protocol (TCP/IP) connection. The gateway 246 serves as a point of entry into each network 244. The gateway 246 may be coupled to another network 242 by means of a communications link 250A. The gateway 246 may also be directly coupled to one or more workstations 110, 150, using communications links 250B, 250C, respectively.

The gateway 246 may be distant from the network 242, and similarly, the workstations 110, 150, 160, 170, 180 may be located remotely from the networks 242 and 244. As an example, the network 242 may be located in California, while the gateway 246 may be located in Texas, and one or more of the workstations 110 may be located in New York. The workstation 110 may be connected to the wireless network 242 using a networking protocol, such as the TCP/IP, over a number of alternative connection media, such as cellular phone networks, radio frequency networks, satellite networks, etc.

The wireless network 242 is connected to the gateway 246 using a network connection 250A such as Transmission Control Protocol or User Datagram Protocol (UDP) over Internet Protocol, X.25, Frame Relay, Integrated Services Digital Network (ISDN), Public Switched Telephone Network (PSTN), and so forth. The workstation 110 may alternatively be connected directly to the gateway 246 using a dial up connection. Further, the networks 242 and 244 may be connected to one or more other networks (not shown), in an analogous manner to that depicted in FIG. 2.

In use, a user's computer, i.e., 160 may be connected to a server (or gateway) 246 embodying the visual query system 10 using a wired connection or a wireless connection. Wired connections are those that use physical media such as cables and telephone lines, whereas wireless connections use media such as satellite links, radio frequency waves, and infrared waves. Many connection techniques can be employed with these various media, such as: using the computer's modem to establish a connection over a telephone line; using a Local Area Network card such as Token Ring or Ethernet; using a cellular modem to establish a wireless connection, etc. The user's computer 160 may be any type of computer processor, including laptop, handheld or mobile computers; vehicle-mounted devices; desktop computers; mainframe computers; etc., having processing and communication capabilities. The remote server 246 can similarly be one of many computer types with processing and communication capabilities.

Figure 3:
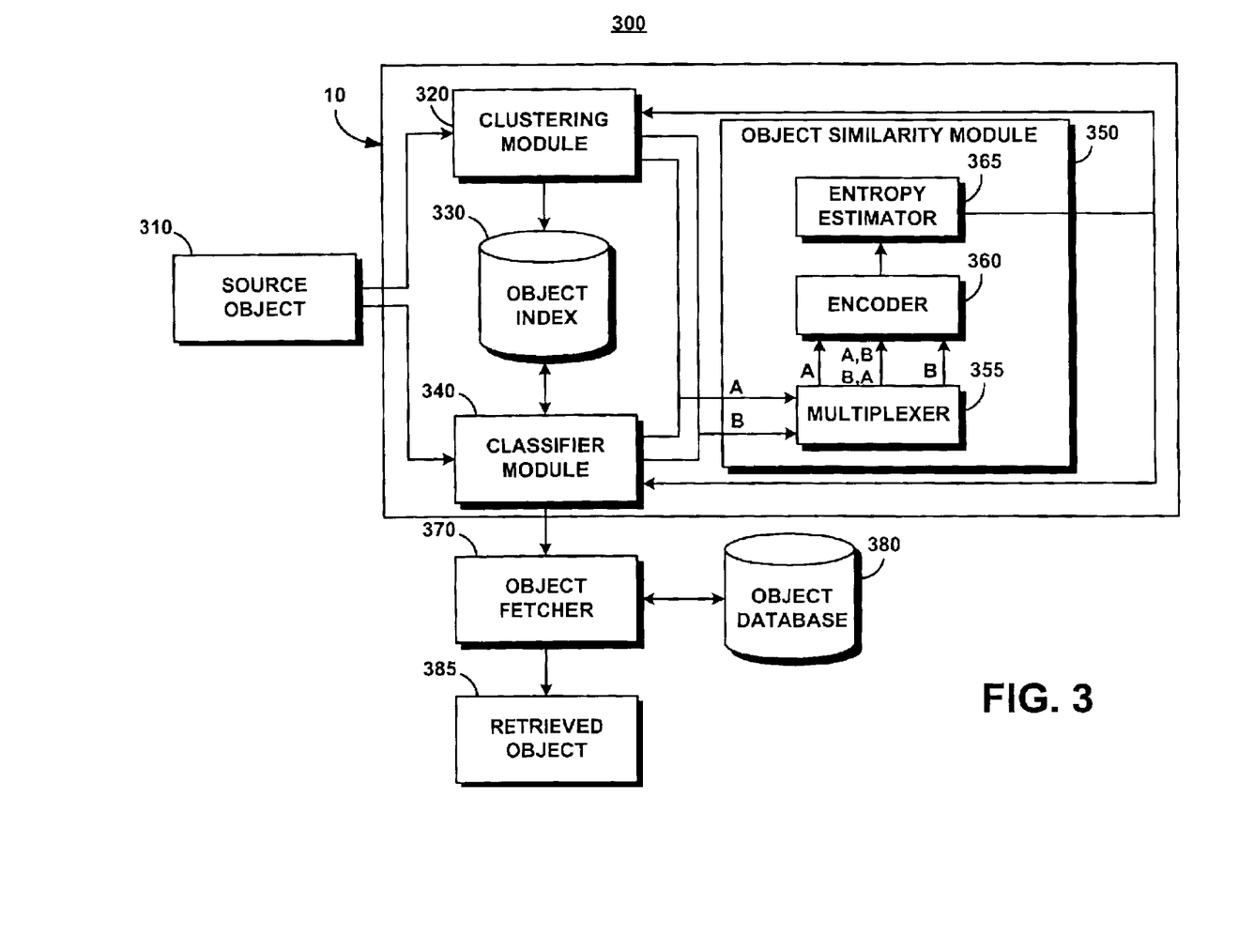
FIG. 3 is a block diagram of a search system using the visual query system of FIG. 1.

FIG. 3 is a block diagram of a search system 300 that uses the visual query system 10, and illustrates how objects can be queried by content. A source object 310 that contains images, pictures, graphs, or such other visual representations, is fed to system 10. System 10 comprises a clustering module 320 that indexes the content of object source 310, and builds a hierarchical object index 330 using clusters derived from pair-wise distance computations performed by an object similarity module 350. As used herein, the terms "source image" and "query image" are interchangeably used, and so are the terms "candidate image" and "target image.

The object similarity module 350 is comprised of a multiplexer 355, an encoder 360, and an entropy estimator 365. As it will be explained later in greater detail, the multiplexer 355 multiplexes a source (or query) object A with a selected number of targets (also referred to as candidate object or target objects) B. For illustration purpose, only one target object B is shown. For every source object—target object pair (A, B), 3 different data streams are produced: A, B, and A & B.

The encoder 360 separately encodes these 3 different streams A, B, and A&B, and then compares the corresponding encoded data streams. The entropy estimator 365 then estimates, calculates, or otherwise determines how much more information is needed to compare or correlate between the encoded data streams by comparing the corresponding file sizes.

In an exemplary preferred embodiment, the object index 370 may include clusters that grouped hierarchically around carefully chosen cluster seeds (or representatives) so that all the objects falling within a given cluster are at a distance from that cluster's seed. This distance is computed by the object similarity module 350. Such clustering technique allows the system 10 to avoid scanning the entire object database 380, thus saving time and resources. Clustering methods are known and available. An example clustering method is the generalized BIRCH clustering framework.

Once the object index 330 is built and stored in a repository, querying with a given object can be performed by traversing the cluster hierarchy (e.g., by following the path to the closest cluster seed at each level) and returning all objects within a certain distance from the query object. This traversal is performed by a classifier module 340, which classifies the query object into one or more indexed clusters and refines the search to within those clusters only. In another embodiment, the object index 330 may be omitted. Instead of precomputing pair-wise distances, all such computations are done in real-time.

The object fetcher 370 returns retrieved objects 385 from the object database 380 using the object identifiers provided by the classifier module 340. The advantage of this framework abstraction is that it may be applied to any media by plugging in a single domain-specific encoding module, which reuses existing software and hardware technology for that domain.

In another embodiment, the visual query and retrieval process can be accelerated by using a mapping technique known as "anchoring," in conjunction with an indexing technique to index the objects prior to the online search phase. Anchoring is used to map objects into k-dimensional vectors by using only pair-wise distance computations between the objects. Once the objects are mapped into this k-dimensional space, the original distance between any two objects is well approximated by simple Euclidean distance on their k-dimensional vector representations.

In the anchoring algorithm k objects (called anchors), which are spread out, are selected from the object database 380. For each object X in the object database 380 and for all anchors $A_i$, let $X_i$=dist(X, $A_i$), where dist( ) computes the distance score between two objects. Then, the vector ($X_1$, $X_2$, ..., $X_k$) becomes the k-dimensional representation of object X.

Anchoring represents objects relative to a few fixed anchors. Thus, if two objects are similar, their relative positions (or distances) with respect to each of the fixed anchors are similar (or substantially similar), the two vectors are said to be similar (or substantially similar). If the objects differ in their positions with respect to any of the anchors, however, it is unlikely (although possible) that they are to each other. One property of the anchoring technique is that it computes a k-dimensional representation embedding the objects that closely approximates the original pair-wise object distances. The quality of the approximation depends on the anchor selection method, and on the properties of the original distance function, such as triangle inequality or symmetry.

Figure 4:
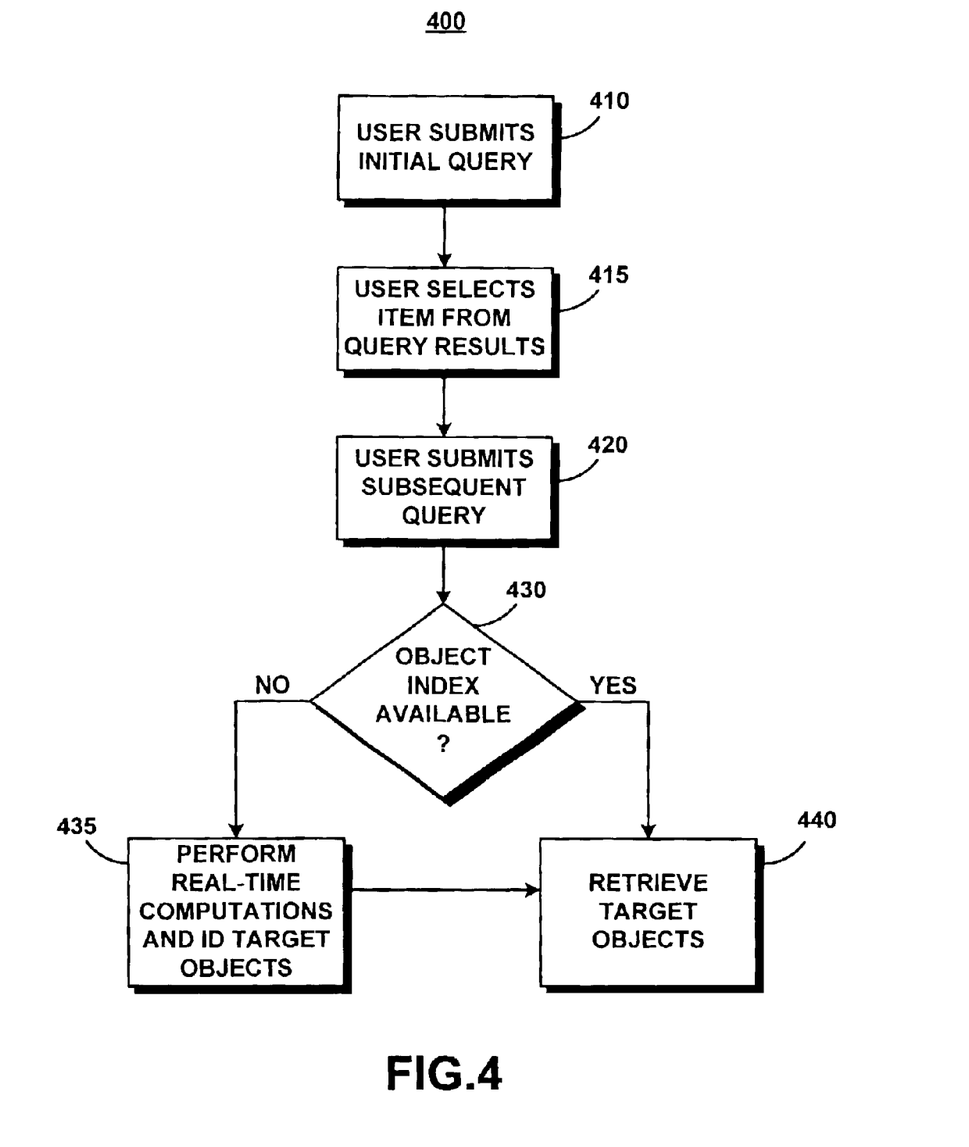
FIG. 4 is a process flow chart illustrating the operation of the visual query system of FIG. 1.

The flow chart of FIG. 4 illustrates a method 400 for the implementation of the visual query system of FIGS. 1 and 3. At step 410, the user submits an initial text-based query to the visual query system 10. As an example, the text-based query is for a necktie.

At step 415, the user reviews the search results returned by the search system 300 of FIG. 3, in the form of images, and selects an object item of interest. At step 420 the user submits an object-based subsequent query based on the selected object by, for example, dragging and dropping the selected object in a visual query field.

Figure 6:
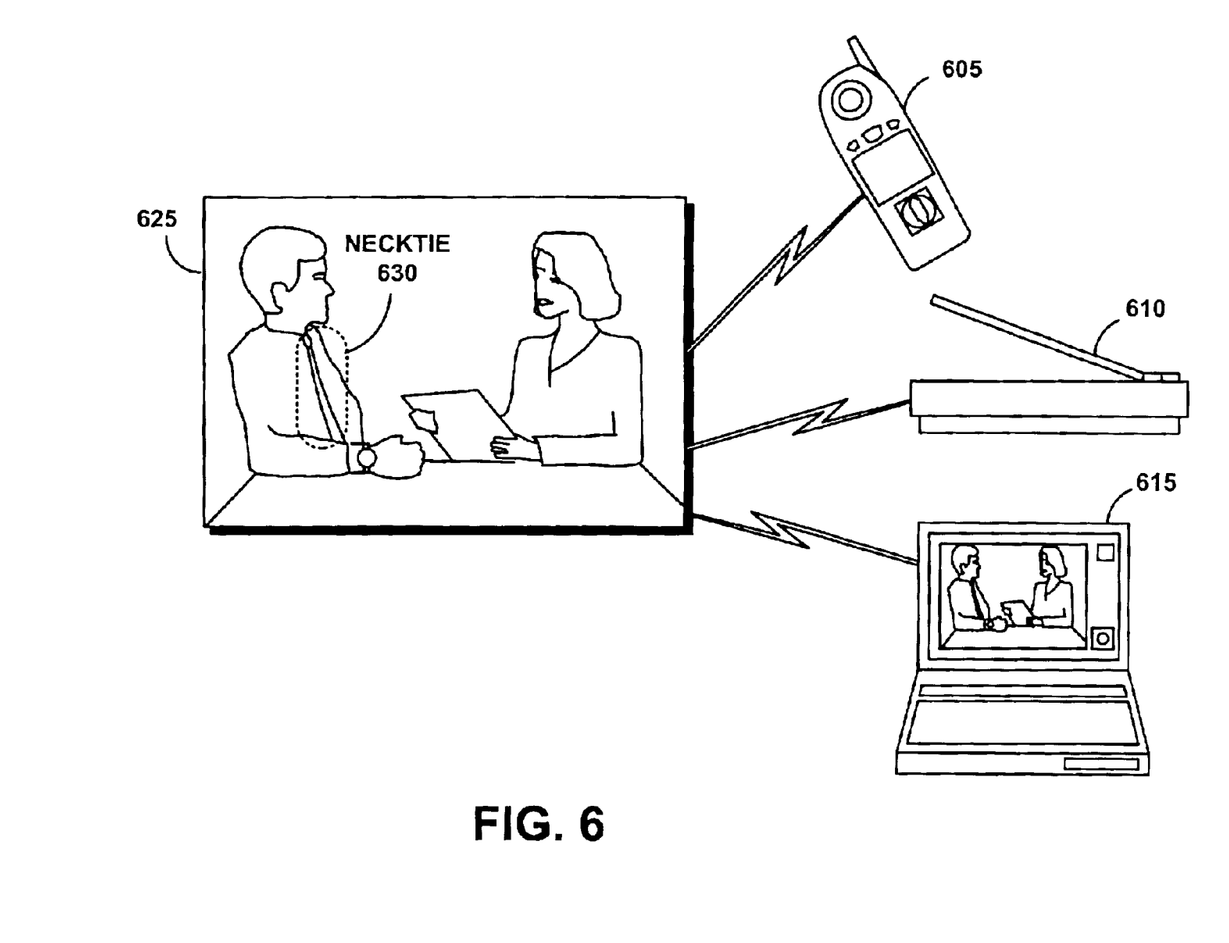
FIG. 6 illustrates an example object selection implemented by the visual query system of FIGS. 1 and 3.

With further reference to FIG. 6, the user selects an object 625. As used herein, an object contains images, pictures, graphs, web pages, or such other visual representation. Object 625 can be a digital image that was inputted by a cellular phone (or digital camera) 605 or a scanner 610, or downloaded from the Internet or another computer 615. Object 625 corresponds to the source object 310 of FIG. 3.

Alternately, the user can select a specific item of interest from the source object 310, such as a necktie 630. The selected item is also referred to herein as the source object 630, which is inputted by the user into the visual query system 10, at step 420 of FIG. 4. Using the source object 630, system 10 automatically identifies and retrieves, target objects from the object database 380 (FIG. 3) that match the content-based inquiry, as it will be described later in more detail in connection with FIG. 5.

At step 415, the user selects an item of interest, or the source object 630, within the source object 310. In an alternative embodiment, the user directly submits a digital image of the source object 630 to the search system 300 at step 420.

At decision step 430, system 10 checks for the availability of an object index 330 (FIG. 3). If no object index 330 exists, system 10 continues at step 435, else, it proceeds to step 440. At step 435, system 10 computes the compressed data file and estimated entropy distance scores for each of the target objects with respect to the source object of interest, using known or available video compression techniques. Step 435 is implemented by the object similarity module 350 of FIG. 5.

After computing all dissimilarity, or distance, scores for all target objects with respect to the query object of interest, system 10 identifies the target objects that are relevant to the query object, and then proceeds to step 440 to retrieve those relevant target objects. Otherwise, if an object index 330 (FIG. 3) exists, system 10 determines the set of relevant target objects based on the information stored in the index. At step 440, system 10 performs the similarity computations required to identify and retrieve the similar objects from the object repository 380.

Figure 5:
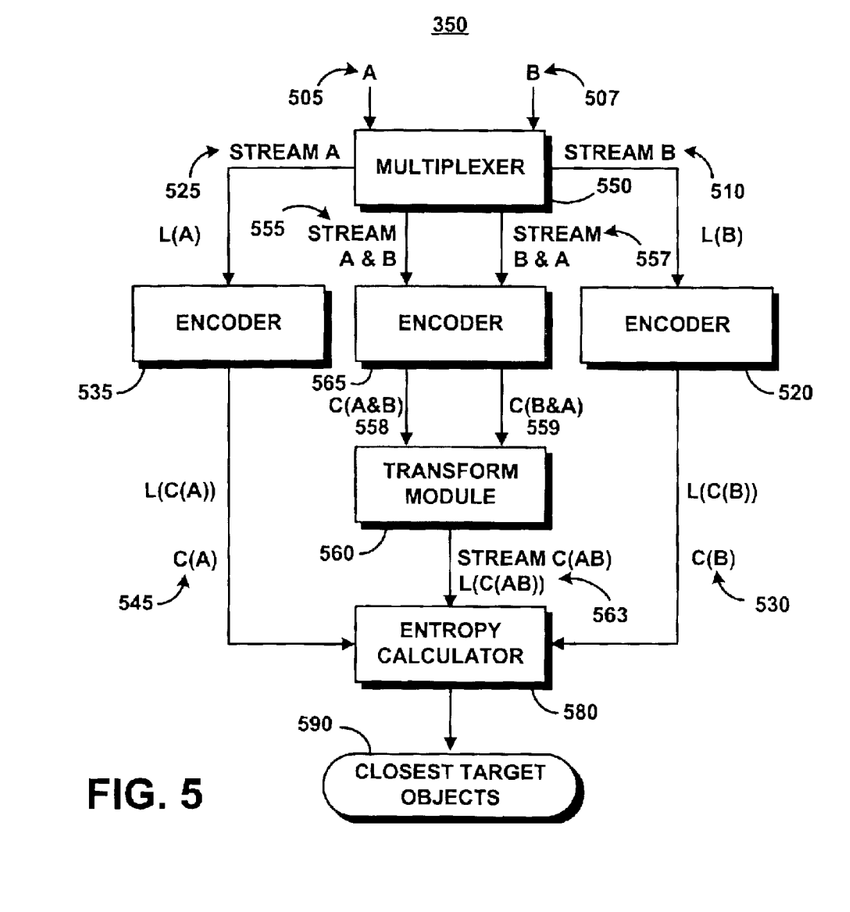
FIG. 5 is a block diagram of an object similarity module that forms part of the visual query system of FIGS. 1 and 3.

Referring now to FIG. 5, it represents a block diagram of the object similarity module 350, illustrating the main components for performing the similarity computations and for comparing a source object A 505 to a target object B 507 according to a preferred embodiment of the present invention. Source Candidate object A 505 and target object B 507 are inputted into a multiplexer 550 which, in turn, outputs the following four uncompressed streams: A, B, A&B, and B&A. These streams are respectively referenced by the numerals 525, 510, 555, and 557, where the streams 555 and 557 denote concatenations of source object A 505 and target object B 507 into a single stream. As an example, two images are concatenated as consecutive frames in a video sequence.

Stream A 525 is an uncompressed stream of source object A 505 of length L(A). Stream A 525 is encoded by an encoder 535, such as a video encoder or compressor, resulting in a compressed stream C(A) 545 of length L(C(A)).

Similarly, stream B 510 is an uncompressed stream of target object B 507 of length L(B). Stream B 510 is encoded by an encoder 520, or alternatively by the same encoder 535 described earlier. The encoding of stream B 510 results in a compressed stream C(B) of length L(C(B)). An encoder 565 encodes both streams A&B 555 and B&A 557, and the transformation can optionally be applied by a transform module 560 on the resulting distance scores L(C(A&B)) and L(C(B&A)) of the encoded streams C(A&B) 558, and C(B&A) 559, respectively.

Generally but not necessarily, the distances (or distance scores) for stream A&B 555 and stream B&A 557 are asymmetric. That is, the distance between the source object A and the target object B is not substantially equal or comparable to the distance between the target object B and the source object A. As used herein, a distance or distance score refers to the visual or other semantic dissimilarity between two objects. Due to certain considerations, such as computational efficiency and retrieval quality of the system, it is often desirable to employ distances that are substantially symmetric.

To this end, the transform module 560 can optionally be applied to the distance scores computed from streams C(A&B) 558, and C(B&A) 559, in order to produce a single distance score L(C(AB)) 563 for the two streams, i.e., to render their distances substantially symmetric. This is accomplished, for example, by computing the average, the product, the minimum, or the maximum of the two asymmetric distances, and associating the result as the distance of streams C(A&B) 558, and C(B&A) 559.

If the original distances of streams A&B 555 and B&A 557 are normalized in the [0, 1] range, the calculated symmetric versions will also be within that range.

Stream A 525, and stream B 510, are two objects (which may include images, audio, video, text, PDF files, web pages, etc.) to be compared utilizing the visual query system 10. They do not have to be of the same domain provided that their respective domains can be interpreted by known or available plug-in compression modules and that they maintain some similarity between them. Such similarities include, for example a similarity between a video frame and an image, between a product catalog PDF file and a text document, or between a graphical web page and an image.

Encoders 520, 535, and 565 can be, for example, any known or available video encoders, each operating on an uncompressed stream and outputting a compressed representation of the input uncompressed stream. Encoders 520, 535, and 565 may be video codecs, text compression utilities, MP3 audio codecs, or any compression tool that utilizes differential coding. In other terms, encoders 520, 535, and 565 encode pieces of new information by encoding the difference from a prediction based on previously seen information of the same kind.

Stream A 525 is inputted into encoder 535 that outputs the compressed stream C(A) 545. Similarly, Stream B 510 is inputted into encoder 520 that outputs the compressed stream C(B) 530.

As an example, encoder 520 predicts colors in an image from the colors seen in previously encoded images. Encoder 535 encodes words in a text document by making predictions based on the word distribution of previously seen text. Encoders 520, 535, and 565 may be implemented in software, firmware, or hardware. Given a prediction for what word, color, etc. is likely to come next, the encoder 520, 535, or 565 optimizes compression performance by assigning shorter bitstream representations for highly probable pieces of information (i.e., common characters, words, colors, intensities, etc.) and assigning longer bitstream representation for less likely information.

An entropy calculator 580 measures the compression ratios by approximating the entropies of both datastreams C(A) and C(B) that correspond to objects A and B, respectively. Alternatively, the entropy calculator 580 measures the compression ratio of a single object, such as that of the datastream C(A) corresponding to the source object A, while using the other object, i.e., the datastream C(B) corresponding to the target object B, as a prediction.

The entropy calculator 580, then computes a dissimilarity score or value, that is the distance score for objects A and B. In an alternative embodiment, the entropy calculator 580 measures the compression loss, which is the difference in the compression ratios when both objects A and B are treated independently compared to when using one object as a prediction for the other. Dissimilarity scores can then be converted into similarity scores by subtracting each distance score from unity (i.e., 1), as follows:

similarity $(A,B)=1-$distance $(A,B)$, where:

distance$(A,B)=[C(A\&B)/(C(A)+C(B))]$, and $0 \leq$ similarity $(A,B)<1$.

The entropy calculator 580 returns the target objects that are closest to the source object A, that is whose entropies, distance scores, or similarity values are within an acceptable range. An entropy is determined by a distance scores. The relative entropy of target object B, given source object A, is an inversely-proportional measure of how much in common target object B has with source object A.

Entropies, distance scores, or similarity values are likely to be in the [0, 1] range since the compressed size is typically smaller than the original size. In rare cases. A score of 0 means that the source object A 505 and the target object B 507 are identical.

System 10 utilizes entropy as a similarity score between a pair of objects A, B. However, system 10 can be implemented according to alternative embodiments using different distance scores, among which are the following:

$D1=L(C(AB))/L(AB)$, where D1 is the compression ratio of AB, or the compressed length over the uncompressed length, and approximates the entropy of AB. The smaller D1 is, the more similar the two objects A, B are.

$D2=(L(C(AB))-L(C(A)))/L(B)$.

D2 is similar to D1 but measures the compression ratio of object B alone, while using object A to predict the relative entropy of object B given the entropy of object A.

$D3=(L(C(AB))-L(C(A)))/L(C(B))$.

D3 is similar to D2 but measures the compression loss when compressing object B independently, as opposed to compressing object B as a prediction from object A.

$D4=L(C(AB))/(L(C(A))+L(C(B)))$.

D4 is similar to D3 but measures the loss over stream AB, not just the loss over stream B.

D1 and D2 measure the compression ratios by approximating the entropies of both objects A and B, or of a single object while using the other object as a prediction. Thus, techniques utilizing D1 or D2 compression ratios capture the distance between two objects as the amount of different information contained in these objects.

In contrast, D3 and D4 measure the compression loss, which is the difference in the compression ratios when both objects A and B are treated independently as opposed to when using one object as a prediction for the other. Therefore techniques utilizing D3 or D4 compression ratios capture the distance between two objects A and B as a relative loss in compression performance.

It is to be understood that the specific embodiments of the present invention that are described herein are merely illustrative of certain applications of the principles of the present invention. Numerous modifications may be made without departing from the scope of the invention. For instance, the field of the invention is not limited to Internet shopping or e-commerce, and may be extended to find products similar to a favored product by image content, and to provide powerful tools for medical imaging and diagnosis applications, satellite imagery, such as 3-D graphs of thermal data and seismic data used in finding oil, weather prediction, visual comparison of topographical maps, and other similar applications.

What is claimed is:

1. A method of implementing a content based image query, comprising:
    encoding at least two images in a sequence of frames;
    using an encoding ratio as a distance measure between the two images; and
    determining a degree of similarity between the two images by using the distance measure to estimate a differential amount of information between the two images.

2. The method of claim 1, wherein encoding the two images comprises compressing the two images as consecutive frames in a video sequence.

3. The method of claim 2, wherein using the encoding ratio comprises using a video compression ratio.

4. The method of claim 1, wherein the two images comprise a source image.

5. The method of claim 4, wherein the two images further comprise a candidate image from a plurality of candidate images.

6. The method of claim 5, wherein the candidate image is stored on a local repository.

7. The method of claim 5, wherein the candidate image is stored on a networked repository.

8. The method of claim 5, wherein the candidate image is stored on a web-linked repository.

9. The method of claim 5, wherein the source image contains a digital image.

10. The method of claim 5, wherein the source image contains a picture.

11. The method of claim 5, wherein the source image contains a graph.

12. The method of claim 5, wherein the source image contains a visual representation.

13. The method of claim 5, further comprising multiplexing the source image with a candidate image.

14. The method of claim 13, wherein encoding the two images comprises encoding the two images into three separate data streams.

15. The method of claim 14, wherein encoding the two images into three separate data streams comprises:

encoding a first stream that includes the source image to obtain a first compressed data stream with a file length C(A);

encoding a second stream that includes the candidate image to obtain a second compressed data stream with a file length C(B); and encoding a third stream that includes the source image and the candidate image to obtain a third compressed data stream with a file length C(A&B).

16. The method of claim 15, further comprising calculating the distance measure, distance (A,B), between the source and candidate object, as follows:

$$\text{distance } (A,B)=[C(A\&B)/(C(A)+C(B))].$$

17. The method of claim 16, wherein determining the degree of similarity between the two images, similarity (A,B), comprises calculating the similarity between the two images, as follows:

$$\text{similarity } (A,B)=1-\text{distance } (A,B),$$

where:

$$0 \leq \text{similarity } (A,B) < 1.$$

18. The method of claim 5, further comprising retrieving candidate image within a predetermined distance measure from the source image.

19. The method of claim 18, further comprising indexing the candidate images.

20. The method of claim 19, further comprising anchoring the candidate images using selected fixed anchors.

21. A computer program product having instruction codes for implementing a content based image query, comprising:

a first set of instruction codes for encoding at least two images in a sequence of frames;

the first set of instruction codes uses an encoding ratio as a distance measure between the two images; and a second set of instruction codes for determining a degree of similarity between the two images by using the distance measure to estimate a differential amount of information between the two images.

22. The computer program product of claim 21, wherein the first set of instruction codes compresses the two images as consecutive frames in a video sequence.

23. The computer program product of claim 22, wherein the encoding ratio includes a video compression ratio.

24. The computer program product of claim 23, wherein the first set of instruction codes encodes the two images into three separate data streams:

a first stream that includes the source image to obtain a first compressed data stream with a file length C(A);

a second stream that includes the candidate image to obtain a second compressed data stream with a file length C(B); and a third stream that includes the source image and the candidate image to obtain a third compressed data stream with a file length C(A&B).

25. The computer program product of claim 24, wherein the second set of instruction codes calculates the distance measure, distance (A,B), between the source and candidate object, as follows:

$$\text{distance } (A,B)=[C(A\&B)/(C(A)+C(B))], \text{ and}$$

further calculates the degree of similarity between the two images, similarity (A,B), as follows:

$$\text{similarity } (A,B)=1-\text{distance } (A,B),$$

where:

$$0 \leq \text{similarity } (A,B) < 1.$$

26. The computer program product of claim 21, wherein the two images comprise a source image and a candidate image from a plurality of candidate images.

27. The computer program product of claim 26, wherein the candidate image is stored on any one or more of a local repository, a networked repository, and a web-linked repository.

28. The computer program product of claim 26, wherein the source image contains any one or more of a digital image, a picture, a graph, and a visual representation.

29. The computer program product of claim 26, further comprising a multiplexer that multiplexes the source image a candidate image.

30. The computer program product of claim 26, further comprising a third set of instruction codes for indexing the candidate images.

31. A visual query system for implementing a content based image query, comprising:

means for encoding at least two images in a sequence of frames;

the encoding means uses an encoding ratio as a distance measure between the two images; and means for determining a degree of similarity between the two images by using the distance measure to estimate a differential amount of information between the two images.

32. The system of claim 31, wherein the encoding means compresses the two images as consecutive frames in a video sequence.

33. The system of claim 32, wherein the encoding ratio includes a video compression ratio.

34. The system of claim 33, wherein the encoding means encodes the two images into three separate data streams:

a first stream that includes the source image to obtain a first compressed data stream with a file length C(A);

a second stream that includes the candidate image to obtain a second compressed data stream with a file length C(B); and a third stream that includes the source image and the candidate image to obtain a third compressed data stream with a file length C(A&B).

35. The system of claim 34, wherein the means for determining the degree of similarity calculates the distance measure, distance (A,B), between the source and candidate object, as follows:

$$\text{distance } (A,B)=[C(A\&B)/(C(A)+C(B))], \text{ and}$$

further calculates the degree of similarity between the two images, similarity (A,B), as follows:

$$\text{similarity } (A,B)=1-\text{distance } (A,B),$$

where:

$$0 \leq \text{similarity } (A,B) < 1.$$

36. The system of claim 31, wherein the two images comprise a source image and a candidate image from a plurality of candidate images.

37. The system of claim 36, wherein the candidate image is stored on any one or more of a local repository, a networked repository, and a web-linked repository.

38. The system of claim 36, wherein the source image contains any one or more of a digital image, a picture, a graph, and a visual representation.

39. The system of claim 36, further comprising means for multiplexing the source image and the candidate image.

40. The system of claim 36, further comprising a clustering means for indexing the candidate images.

* * * * *